United States Patent
Yamada et al.

(10) Patent No.: US 8,362,147 B2
(45) Date of Patent: Jan. 29, 2013

(54) THERMOPLASTIC RESIN COMPOSITION AND MOLDED BODY THEREOF

(75) Inventors: Hirotsugu Yamada, Takasago (JP); Koji Yui, Settsu (JP)

(73) Assignee: Kaneka Corporation, Osaka (JP)

( * ) Notice: Subject to any disclaimer, the term of this patent is extended or adjusted under 35 U.S.C. 154(b) by 99 days.

(21) Appl. No.: 12/810,919

(22) PCT Filed: Dec. 25, 2008

(86) PCT No.: PCT/JP2008/073508
§ 371 (c)(1),
(2), (4) Date: Jun. 28, 2010

(87) PCT Pub. No.: WO2009/084555
PCT Pub. Date: Jul. 9, 2009

(65) Prior Publication Data
US 2010/0286337 A1     Nov. 11, 2010

(30) Foreign Application Priority Data
Dec. 28, 2007   (JP) .................................. 2007-339287

(51) Int. Cl.
C08F 265/06    (2006.01)
C08J 5/00      (2006.01)
C08L 33/10     (2006.01)
C08L 51/04     (2006.01)

(52) U.S. Cl. ................ 525/81; 525/82; 525/85

(58) Field of Classification Search .................. 523/201; 525/85, 81, 82
See application file for complete search history.

(56) References Cited

U.S. PATENT DOCUMENTS

| | | | |
|---|---|---|---|
| 4,120,833 A * | 10/1978 | Purvis et al. ............... | 521/81 |
| 4,439,589 A | 3/1984 | Alberts et al. | |
| 4,542,185 A | 9/1985 | Meunier | |
| 6,686,411 B2 | 2/2004 | Iguchi et al. | |
| 2002/0165311 A1 | 11/2002 | Iguchi et al. | |
| 2003/0225190 A1 * | 12/2003 | Borbely et al. ............ | 523/201 |
| 2004/0039110 A1 * | 2/2004 | Coyle et al. ................ | 524/568 |
| 2004/0152821 A1 | 8/2004 | Saegusa et al. | |
| 2008/0004402 A1 * | 1/2008 | Borbely et al. ............ | 525/242 |
| 2010/0286337 A1 | 11/2010 | Yamada et al. | |

FOREIGN PATENT DOCUMENTS

| | | |
|---|---|---|
| JP | 4-33907 | 2/1992 |
| JP | 4-145110 | 5/1992 |
| JP | 7-3168 | 1/1995 |
| JP | 10-25321 | 1/1998 |
| JP | 2002-363372 | 12/2002 |
| JP | 2004-123795 | 4/2004 |
| JP | 2007-302842 | 11/2007 |
| WO | 01/72896 | 10/2001 |
| WO | 2009/084555 | 7/2009 |

OTHER PUBLICATIONS

Supplementary European Search Report issued Mar. 16, 2011 in corresponding European Application No. 08 86 8463.
International Search Report issued Mar. 31, 2009 in International (PCT) Application No. PCT/JP2008/073508.
Form PCT/IB/338 together with International Preliminary Report on Patentability and Translation of PCT Written Opinion dated Aug. 19, 2010 in International (PCT) Application No. PCT/JP2008/073508.
International Search Report issued Jun. 15, 2010 in International (PCT) Application No. PCT/JP2010/058704.
Office Action issued Mar. 26, 2012 in copending U.S. Appl. No. 12/823,787.
Office Action issued Dec. 14, 2011 in copending U.S. Appl. No. 12/823,787.

* cited by examiner

*Primary Examiner* — Jeffrey Mullis
(74) *Attorney, Agent, or Firm* — Wenderoth, Lind & Ponack, L.L.P.

(57) ABSTRACT

A thermoplastic resin composition of the present invention capable of improving the strength and surface gloss of a molded article is comprising 100 parts by weight of a thermoplastic resin (a) and 0.5 to 30 parts by weight of a core-shell polymer composition (b), wherein the core-shell polymer composition (b) is obtained by polymerizing a shell-constituting component in the presence of a core obtained by polymerizing a core-constituting component, the core-constituting component contains 70% to 99.95% by weight of an alkyl acrylate having an alkyl group of 2 to 18 carbon atoms, 0.05% to 10% by weight of a polyfunctional monomer, and 0% to 20% by weight of a monomer copolymerizable with the alkyl acrylate and/or the polyfunctional monomer, the total amount of which is 100% by weight, the polyfunctional monomer is one or more selected from the group consisting of polypropylene glycol diacrylate and polypropylene glycol dimethacrylate, and the molecular weight of a component soluble in methyl ethyl ketone and insoluble in methanol of the core-shell polymer composition (b) is 500,000 or higher.

5 Claims, No Drawings

THERMOPLASTIC RESIN COMPOSITION AND MOLDED BODY THEREOF

TECHNICAL FIELD

The invention relates to a thermoplastic resin composition capable of improving the strength and surface gloss of a molded article, and a molded article thereof.

BACKGROUND ART

Since a vinyl chloride based resin is inexpensive and excellent in mechanical strength, weathering resistance, and chemical resistance, it has been used for various applications including building materials and housing materials. However, since the vinyl chloride based resin alone has no sufficient impact resistance strength, a method for adding a graft copolymer obtained by an emulsion polymerization or the like as an impact resistance modifier is currently widely used.

On the other hand, in recent years, in addition to the strength property such as impact resistance, appearance of a molded article such as surface gloss has been regarded to be important and particularly, in a window frame molded article, it has been strongly desired to satisfy both physical properties: that is, strength and gloss.

As a method for improving the impact resistance, disclosed is a method of adding, for example, a diene type or acrylate type soft rubber-containing graft copolymer.

Patent References 1 and 2 disclose graft copolymers containing graft components as shell parts and accompanying free polymers wherein the graft components are soluble in methyl ethyl ketone, insoluble in methanol in core-shell polymer compositions, and having a specific viscosity ($\eta sp$) of 0.19 or higher measured at 30° C. in form of 0.2 g/100 ml acetone solution thereof, that is, polymer chains with high molecular weights; however they are techniques aiming to improve the weathering resistance, impact resistance, and secondary processability and the effect of improving gloss of a molded article is not mentioned, and these techniques are not sufficient as a method for satisfying both of gloss and impact resistance at high levels.

Patent Reference 3 discloses improvement of impact resistance by a graft copolymer containing, as a polyfunctional crosslinking agent, polyethylene glycol dimethacrylate having a main chain composed of —$CH_2$—$CH_2$—O— as a repeating unit; however Patent Reference 3 does not mention the effect of improving the gloss of a molded article, and similarly to Patent References 1 and 2, is not sufficient as a method for satisfying both of gloss and impact resistance at high levels, as described above, and also it cannot be said that impact resistance is sufficient.

A filler such as calcium carbonate is compounded to a vinyl chloride based resin composition for building fields and it is possible to improve the surface gloss to a certain extent by decreasing the compounding amount thereof; however it undesirably leads to rise of cost. Although the surface gloss can be improved also by increasing the molding temperature, there are many problems such as occurrence of thermal decomposition of vinyl chloride. Moreover, gloss can be improved by using, as a processing aid, a large quantity of a copolymer containing methyl methacrylate as a main component; however, the torque is increased due to the increase of melt viscosity and there is another problem of decrease of impact resistance.

That is, among conventionally known methods, there is not the method for improving both of gloss and impact resistance to high levels, which are particularly desired in recent years, and thus it has been desired to find the improvement method.

Accordingly, development of a graft copolymer satisfying both impact resistance and surface gloss has been desired.

Patent Reference 1: Japanese Patent Laid-open Publication No. 4-033907
Patent Reference 2: Japanese Patent Laid-open Publication No. 2002-363372
Patent Reference 3: Japanese Patent Laid-open Publication No. 7-3168

DISCLOSURE OF THE PRESENT INVENTION

Problems that the Present Invention is to Solve

An object of the present invention is to provide a thermoplastic resin composition capable of improving the strength and surface gloss of a molded article, and a molded article thereof.

Means for Solving the Problems

In view of such situation, the inventors have made intense studies to solve the above-mentioned problems, thus have found that high impact resistance and good surface gloss can be obtained in a case where a graft copolymer containing polypropylene glycol diacrylate or polypropylene glycol dimethacrylate as an impact resistance improver is compounded to a thermoplastic resin represented by vinyl chloride, and have completed the invention.

That is, the present invention relates to a thermoplastic resin composition comprising 100 parts by weight of a thermoplastic resin (a) and 0.5 to 30 parts by weight of a core-shell polymer composition (b), wherein the core-shell polymer composition (b) is obtained by polymerizing a shell-constituting component in the presence of a core obtained by polymerizing a core-constituting component, the core-constituting component contains 70% to 99.95% by weight of an alkyl acrylate having an alkyl group of 2 to 18 carbon atoms, 0.05% to 10% by weight of a polyfunctional monomer, and 0% to 20% by weight of a monomer copolymerizable with the alkyl acrylate and/or the polyfunctional monomer, the total amount of which is 100% by weight, the polyfunctional monomer is one or more selected from the group consisting of polypropylene glycol diacrylate and polypropylene glycol dimethacrylate, and the molecular weight of a component soluble in methyl ethyl ketone and insoluble in methanol of the core-shell polymer composition (b) is 500,000 or higher.

A preferred embodiment is the thermoplastic resin composition, wherein the number of propylene glycol chain repeating units of the polyfunctional monomer contained in the core-constituting component of the core-shell polymer composition (b) is 2 or higher in average.

A preferred embodiment is the thermoplastic resin composition, wherein the number of propylene glycol chain repeating units of the polyfunctional monomer contained in the core-constituting component of the core-shell polymer composition (b) is lower than 12 in average.

A preferred embodiment is the thermoplastic resin composition, wherein the core-shell polymer composition (b) contains 50% to 95% by weight of the core-constituting component and 5% to 50% by weight of the shell-constituting component, based on the total amount of the core-shell polymer composition (b) being 100% by weight.

A preferred embodiment is the thermoplastic resin composition wherein the thermoplastic resin (a) is a vinyl chloride based resin.

A preferred embodiment is a molded article obtained by molding the thermoplastic resin composition.

A preferred embodiment is the molded article wherein the molded article is a window frame or a door frame.

Effects of the Invention

According to the graft copolymer of the invention, obtained are high impact resistance and good surface gloss in a case of being compounded as an impact resistance improver to a thermoplastic resin represented by vinyl chloride.

BEST MODE FOR CARRYING OUT THE INVENTION

Thermoplastic Resin Composition

The thermoplastic resin composition of the invention is a thermoplastic resin composition containing 100 parts by weight of a thermoplastic resin (a) and 0.5 to 30 parts by weight of a core-shell polymer composition (b). The content of the core-shell polymer composition (b) is required to be 0.5 to 30 parts by weight in terms of the quality and cost; however it is preferably 0.5 to 20 parts by weight. In a case the content exceeds 30 parts by weight, the effect of improving the impact resistance is sufficient; however qualities other than that, for example, mold processability may be deteriorated and cost may be raised.

To the thermoplastic resin composition of the invention may be properly added additives, if necessary, such as an antioxidant, a stabilizer, an ultraviolet absorbent, a pigment, an antistatic agent, a lubricant, a processing aid, or the like.

A molded article obtained by forming the thermoplastic resin composition of the invention as a material can be preferably used as a window frame or a door frame.
(Stabilizer)

To prevent deterioration (discoloration and deterioration of mechanical and electrical properties) due to dehydrochlorination reaction by heat and ultraviolet as well as oxygen in processing or using, a vinyl chloride resin is generally used with a stabilizer. Such a stabilizer is classified mainly into a lead compound type stabilizer, a metal soap type stabilizer, an organotin type stabilizer and the like, and among them, a lead compound type stabilizer is often used since it is excellent in heat stability and electrical insulation property and inexpensive. However, recently, in applications for products to which human being touches, such as building materials and housing materials, in terms of health and environmental preservation, use of the lead compound type stabilizer tends to be reduced and as an alternative stabilizer, particularly a harmless CaZn type stabilizer among metal soap type stabilizers tends to be used. Accordingly, as the above-mentioned stabilizer, one or more kinds selected from lead compound type, organotin type, and metal soap type are preferable and in terms of health and environmental preservation, the organotin type and metal soap type are preferable, and the metal soap type is more preferable and CaZn type is particularly more preferable.
(Thermoplastic Resin (a))

The thermoplastic resin (a) that can be used in the invention preferably contains vinyl chloride based resin, (meth)acryl based resin, styrene based resin, carbonate based resin, amide based resin, ester based resin, olefin based resin and the like.

Among them, in a case the graft copolymer of the invention is particularly used as an impact resistance improver of the vinyl chloride based resin, it can exhibit an excellent effect, and therefore, the vinyl chloride based resin is preferable. In this invention, the vinyl chloride based resin means a vinyl chloride homopolymer or a copolymer containing at least 70% by weight of a unit derived from vinyl chloride.
(Core-Shell Polymer Composition (b))

The core-shell polymer composition (b) of the invention is obtained by polymerizing a shell-constituting component in the presence of a core obtained by polymerizing a core-constituting component. In terms of attainment of good impact resistance and good surface gloss, the ratio of the core-constituting component and the shell-constituting component is preferably 50% to 95% by weight of the core-constituting component and 5% to 50% by weight of the shell-constituting component, more preferably 60% to 90% by weight of the core-constituting component and 10% to 40% by weight of the shell-constituting component, and particularly preferably 70% to 85% by weight of the core-constituting component and 15% to 30% by weight of the shell-constituting component, based on the total amount of the core-shell polymer composition (b) being 100% by weight.

The core-shell polymer composition (b) can be produced by, for example, an emulsion polymerization method, a suspension polymerization method, a micro-suspension polymerization method, a mini-emulsion polymerization method, a water-dispersion polymerization method and the like, in terms of easiness of structure control, the composition produced by an emulsion polymerization method can be suitably used.

The latex and particles of the core-shell polymer thus obtained are recovered as a powder by heat treatment, washing, dewatering, and drying steps, if necessary, after coagulation treatment such as salting-out, acid precipitation, and the like. The recovery method of a powder is not limited to the above-mentioned methods; however the core-shell polymer latex can be recovered also by, for example, spray drying.

The core-shell polymer composition (b) may contain an anti-caking agent in order to improve the blocking resistance of the powder, and an anionic surfactant polyvalent metal salt, inorganic particles, crosslinked polymers and/or silicone oil can be suitably used. Examples of the anionic surfactant polyvalent metal salt may include higher fatty acid salts, higher alcohol sulfuric acid ester salts, alkyl aryl sulfonic acid salts, and the like, but are not limited to these salts. Examples of the inorganic particles may include calcium carbonate, silicon dioxide, and the like, but are not limited to these compounds.
(Core)

The core of the core-shell polymer composition (b) of the invention is preferable to have a particle diameter of 0.05 to 0.3 μm in order to exhibit excellent impact resistance when a vinyl chloride type resin is used as the thermoplastic resin (a).

The core of the invention is obtained by polymerization of a monomer mixture, as a core-constituting component, containing 70% to 99.95% by weight of an alkyl acrylate having an alkyl group of 2 to 18 carbon atoms, 0.05% to 10% by weight of a polyfunctional monomer, and 0% to 20% by weight of a monomer copolymerizable with the alkyl acrylate and/or the polyfunctional monomer, the total amount of which is 100% by weight. The polyfunctional monomer is one or more selected from the group consisting of polypropylene glycol diacrylate and polypropylene glycol dimethacrylate.

The polyfunctional monomer of the invention has a methyl group branched from a main chain composed of a repeating unit of C—C—O represented by the following general formula (I) and although the mechanism is not yet made clear, it is supposedly hilly probable that the strength improvement effect of the invention is derived from this characteristic propylene glycol chain structure.

[Chem. 1]

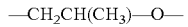  (General formula I)

The number of propylene glycol chain repeating units is preferably 2 or higher and lower than 12 in average. Although the mechanism is not yet made clear, the core of the invention functioning as rubber particles dispersed in the matrix of the thermoplastic resin (a) becomes a crosslinked rubber with a high impact resistance improvement effect, and it is also considered to be a core-shell polymer composition (b) with a high surface gloss improvement effect due to the following reason. From such a viewpoint, the number of the repeating units of the propylene glycol chain is 3 to 8.

That is, although the mechanism is not yet made clear, in a case of polymerization of the shell-constituting component in the presence of the core obtained by polymerization of the polyfunctional monomer of the invention having the above-mentioned characteristics as the core-constituting component, it is considered that the shell-constituting component tends to be a polymer with a high molecular weight; the polymer with a high molecular weight tends to be included as a polymer unit with a high molecular weight, so-called free polymers in the core-shell polymer composition (b) of the invention, without being grafted with the core; and thus the high impact resistance and high surface gloss, which are effects of the invention, can be obtained simultaneously.

It is considered that the characteristics of an increase in the molecular weight of the shell-constituting component polymer and its becoming free polymers are derived from that the reactivities of two double bonds contributing to the crosslinking of the polyfunctional monomer of the invention are equivalent when polymerization of the shell-constituting component, and it is thus assumed that the grafting points where the shell is graft-bonded with the core are lessened as compared with those in a case of using a polyfunctional monomer such as allyl methacrylate, in which the reactivities of double bonds contributing to its crosslinking are not equivalent.

(Free Polymers)

The weight-average molecular weight of the free polymers of the invention is required to be 500,000 or higher, preferably 1,000,000 to 4,000,000, and more preferably 1,200,000 to 2,500,000 to exhibit the good gloss of a molded article, and the free polymers are components soluble in methyl ethyl ketone and insoluble in methanol of the core-shell polymer composition (b) of the invention. That is, it is apparent for a person skilled in the art that the weight-average molecular weight in terms of polystyrene by gel permeation chromatography (GPC) for the free polymers of the invention, which is measured by a method described later (measurement of molecular weight of free polymers), is a weight-average molecular weight of the free polymer component which has not been grafted and that alternative measurement of the weight-average molecular weight apparently evaluates the molecular weight of the graft component of the core-shell polymer composition (b) of the invention.

(Shell-Constituting Component)

In terms of attainment of good surface gloss of a molded article, the shell-constituting component of the invention preferably contains 50% to 100% by weight of methyl methacrylate, 0% to 50% by weight of an alkyl acrylate having an alkyl group of 2 to 18 carbon atoms, and 0% to 20% by weight of a monomer copolymerizable with methyl methacrylate and/or the alkyl acrylate, the total amount of which is 100% by weight.

(Alkyl Acrylate Having an Alkyl Group of 2 to 18 Carbon Atoms)

Representative examples of the alkyl acrylate having an alkyl group of 2 to 18 carbon atoms which is the core-constituting component or the shell-constituting component described above include ethyl acrylate, propyl acrylate, butyl acrylate, 2-ethylhexyl acrylate, 4-hydroxybutyl acrylate, octyl acrylate, dodecyl acrylate, stearyl acrylate and the like.

(Monomer Copolymerizable with the Alkyl Acrylate and/or the Polyfunctional Monomer and/or Methyl Methacrylate)

Examples of the monomer copolymerizable with the alkyl acrylate and/or the polyfunctional monomer and/or methyl methacrylate which are the core-constituting components or the shell-constituting components described above are preferably at least one selected from the group consisting of alkyl methacrylate having an alkyl group; alkyl methacrylates having a hydroxyl group, or an alkoxyl group; vinyl arenes, vinyl carboxylic acids, vinyl cyanides, vinyl halides, vinyl acetate, and alkenes.

Examples of the alkyl methacrylates having an alkyl group include methyl methacrylate, ethyl methacrylate, butyl methacrylate, 2-ethylhexyl methacrylate, 2-hydroxyethyl methacrylate, dodecyl methacrylate, stearyl methacrylate, behenyl methacrylate and the like.

Examples of the vinyl arenes include styrene, α-methyl styrene, monochlorostyrene, dichlorosryrene and the like.

Examples of the vinyl carboxylic acids include acrylic acid, methacrylic acid and the like. Examples of the vinyl cyanides include acrylonitrile, methacrylonitrile and the like. Examples of the vinyl halides include vinyl chloride, vinyl bromide, chloroprene and the like. Examples of the alkenes include ethylene, propylene, butylene, butadiene, isobutylene and the like.

In terms of heat resistance, preferably, the monomer does not include a conjugate diene type monomer. These monomers may be used alone or as a combination of two or more.

EXAMPLES

Next, the invention will be described in more detail with reference to Examples; however it should not be intended that the scope of the invention is limited only to such Examples.

Example 1

Production of Core-Shell Polymer Composition A-1

A glass reactor equipped with a thermometer, a stirrer, a reflux condenser, a nitrogen inlet port, and an apparatus for adding monomers and an emulsifier was loaded with 2500 g of deionized water and 60 g of a 1.0 wt % aqueous sodium lauryl sulfate solution, and the mixture was heated to 50° C. with stirring under nitrogen stream.

Next, a monomer mixture containing 10 g of butyl acrylate (hereinafter, referred to as BA), 10 g of styrene (hereinafter, referred to as St), 4 g of a 10 wt % aqueous sodium lauryl sulfate solution, and 12 g of deionized water was loaded in form of an emulsion thereto.

Then, 0.5 g of cumene hydroperoxide was loaded thereto and after 10 minutes, a mixed solution obtained by dissolving 0.02 g of disodium ethylenediamine tetraacetate and 0.006 g of ferrous sulfate heptahydrate in 25 g of deionized water, and 30 g of a 5 wt % formaldehyde sulfoxylic acid sodium salt were added. After the resulting mixture was stirred for 30 minutes in this state, 2.5 g of cumene hydroperoxide was loaded and further the stirring was continued for 30 minutes.

Then, 260 g of a 3 wt % aqueous potassium persulfate solution (hereinafter, referred to as KPS) was loaded thereto, and a monomer mixture of 1480 g of BA and 26.6 g of polypropylene glycol diacrylate (hereinafter, referred to as PPG #700 DA) with an average number of repeated units of the propylene glycol chains (molecular weight of repeated part: about 700) of 12 was dropwise added for 4.5 hours. Furthermore, simultaneously with the addition of the monomer mixture, 100 g of a 10 wt % aqueous sodium lauryl sulfate solution was continuously added for 4.5 hours. After completion of the addition of the monomer mixture, 30 g of a 3 wt % aqueous KPS solution was loaded and stirring was continued for 3 hours to obtain an acrylate type polymer with a volume average particle diameter of 0.20 μm measured by Microtrac UPA 150 (available from Nikkiso Co., Ltd.). The polymerization conversion ratio of the monomer components forming the acrylate type polymer was 99.5%.

Thereafter, to polymerize a shell for a core of the acrylate type polymer, a monomer mixture of 475 g of methyl methacrylate (hereinafter, referred to as MMA) and 25 g of BA, as a monomer for constituting a shell, was continuously added thereto for 15 minutes. After completion of the addition, 6 g of a 1.0 wt % aqueous KPS solution was loaded, stirring was continued for 30 minutes, then 10 g of a 1.0 wt % aqueous KPS solution was loaded again, and stirring was further continued for 1 hour to complete polymerization. The polymerization conversion ratio of the total monomer components was 99.8% after completion of the polymerization. As described above, a latex of a core-shell polymer composition A-1 consisting of 75 wt % of a core component and 25 wt % of a shell component was obtained.

(Production of White Resin Powder B-1 of Core-Shell Polymer Composition A-1)

The latex of the core-shell polymer composition (A-1) was added to 6000 g of a 2 wt % aqueous calcium chloride solution to obtain a slurry containing coagulated latex particles. Thereafter, the slurry of the coagulated latex particles was heated to 95° C., dewatered, and dried to obtain a white resin powder B-1 of the core-shell polymer composition A-1.

(Preparation of Thermoplastic Resin Composition C-1)

A thermoplastic resin composition C-1 was obtained by blending 100 parts by weight of a vinyl chloride resin (Kanevinyl S-1001, available from Kaneka Corporation), 1.5 parts by weight of a methyl tin mercapto type stabilizer (TM-181 FSJ, available from Katsuta Kako K.K.) as an organotin type stabilizer, 1.0 part by weight of paraffin wax (Rheolub 165, available from Rheochem), 1.2 parts by weight of calcium stearate (SC-100, available from Sakai Chemical Industry Co., Ltd.), 0.1 parts by weight of oxidized polyethylene wax (ACPE-629A, available from Allied Signal Co., Ltd.), 5.0 parts by weight of calcium carbonate (Hydrocarb 95T, available from Omya), 10 parts by weight of titanium oxide (TITON R-62N, available from Sakai Chemical Industry Co., Ltd.), 1.5 parts by weight of a processing aid (KANE ACE PA-20, available from Kaneka Corporation), and 5.0 parts by weight of the white resin powder B-1 of the core-shell polymer composition A-1 with a Henschel mixer.

(Preparation and Evaluation of Molded Article)

The obtained thermoplastic resin composition C-1 was molded into a window frame using a 65 mm anisotropic parallel twin-screw extruder (available from Battenfeld) in the following conditions: molding temperature condition C1/C2/C3/C4/AD/D1/D2/D3/D4=195° C./195° C./193° C./190° C./190° C./200° C./200° C./200° C./200° C. (C1 to C4: cylinder temperature; AD: adapter temperature; D1 to D4: dice temperature), 20 rpm of the screw rotation speed, 95 rpm of the feeder rotation speed; and 100 kg/hr of the discharge amount.

Using a gloss meter available from BYK Gardner, average values of reflectance of 60° light beam for the top surfaces and lower surfaces of the obtained window frame molded articles were calculated to evaluate the surface gloss.

Specimens with 2.7 cm square were cut out from the obtained window frame molded articles to measure Gardner impact strength. Gardner test was carried out in a thermostatic chamber at −20° C. using an 8-pound weight.

Further, the thermoplastic resin composition C-1 was roll-press molded (roll temperature: 180° C. and press temperature: 190° C.) and specimens were cut from the obtained molded articles to measure Izod impact strength.

(Measurement of Free Polymer Molecular Weight)

The obtained thermoplastic resin composition B-1 in an amount of 2 g was swollen in about 100 g of methyl ethyl ketone, which is an extraction solvent for free polymers, and centrifuged. After the centrifugation, a methyl ethyl ketone solution obtained by removing insoluble precipitates and concentrating the supernatant to about 10 g was added to 200 ml of methanol and a small amount of an aqueous calcium chloride solution was added and stirred to recover free polymers, which were precipitates crystallized as components insoluble in methanol. The obtained free polymers were collected by filtration and a free polymer tetrahydrofuran solution obtained by dissolving about 20 mg of the free polymers in 10 ml of tetrahydrofuran was subjected to weight average molecular weight measurement for the precipitates (components soluble in methyl ethyl ketone and insoluble in methanol) by using HLC-8220 GPC (available from Tosoh Corporation). A polystyrene gel column TSKgel Super HZM-H (available from Tosoh Corporation) was used as a column, tetrahydrofuran was used as an eluent, and analysis was carried out in terms of polystyrene.

Example 2

Production of Core-Shell Polymer Composition A-2

A core-shell polymer composition A-2 was produced by the same method as in Example 1, except that 27.5 g of polypropylene glycol dimethacrylate (hereinafter, referred to as PPG #700 DMA) with an average number of repeated units of the propylene glycol chains (molecular weight of repeated part: about 700) of 12 was used in place of 26.6 g of PPG #700 DA. The volume average particle diameter of the acrylate type polymer to be the core was 0.20 µm and the polymerization conversion ratio of the monomer components forming the acrylate type polymer was 99.6%. As described above, a latex of a core-shell polymer composition A-2 consisting of 75 wt % of a core component and 25 wt % of a shell component was obtained. The polymerization conversion ratio of the total monomer components was 99.9% after completion of the polymerization.

(Production of White Resin Powder B-2 of Core-Shell Polymer Composition A-2)

A white resin powder B-2 of the core-shell polymer composition A-2 was obtained in the same manner as in Example 1, except that the latex of the core-shell polymer composition A-2 was used.

(Preparation of Thermoplastic Resin Composition C-2)

A thermoplastic resin composition C-2 was obtained in the same manner as in Example 1, except that 5.0 parts by weight of the white resin powder B-2 of the core-shell polymer composition A-2 was used.

(Preparation and Evaluation of Molded Article)

Window frame molded articles were prepared by the same method as in Example 1 using the obtained thermoplastic resin composition C-2, and the surface gloss, Gardner impact strength, and Izod impact strength were evaluated by the same method as in Example 1.

(Measurement of Free Polymer Molecular Weight)

Using the thermoplastic resin composition C-2, the weight-average molecular weights of components soluble in methyl ethyl ketone and insoluble in methanol were measured by the same method as in Example 1.

Comparative Example 1

Production of Core-Shell Polymer Composition A-3

A core-shell polymer composition A-3 was produced by the same method as in Example 1, except that 4.0 g of allyl methacrylate (hereinafter, referred to as AMA) was used in place of 26.6 g of PPG #700 DA. The volume average particle diameter of the acrylate type polymer to be the core was 0.20 µm and the polymerization conversion ratio of the monomer components forming the acrylate type polymer was 99.8%. As described above, a latex of a core-shell polymer composition A-3 consisting of 75 wt % of a core component and 25 wt % of a shell component was obtained. The polymerization conversion ratio of the total monomer components was 99.7% after completion of the polymerization.

(Production of White Resin Powder B-3 of Core-Shell Polymer Composition A-3)

A white resin powder B-3 of the core-shell polymer composition A-3 was obtained in the same manner as in Example 1, except that the latex of the core-shell polymer composition A-3 was used.

(Preparation of Thermoplastic Resin Composition C-3)

A thermoplastic resin composition C-3 was obtained in the same manner as in Example 1, except that 5.0 parts by weight of the white resin powder B-3 of the core-shell polymer composition A-3 was used.

(Preparation and Evaluation of Molded Article)

Window frame molded articles were prepared by the same method as in Example 1 using the obtained thermoplastic resin composition C-3, and the surface gloss, Gardner impact strength, and Izod impact strength were evaluated by the same method as in Example 1.

(Measurement of Free Polymer Molecular Weight)

Using the thermoplastic resin composition C-3, the weight-average molecular weights of components soluble in methyl ethyl ketone and insoluble in methanol were measured by the same method as in Example 1.

Table 1 shows the structures of the core-shell polymer compositions of Examples 1 and 2 and Comparative Example 1, and evaluation results of the molded articles obtained by compounding them to the thermoplastic resin; that is, the measurement results of the surface gloss, Gardner impact strength, and Izod impact strength.

in the same manner as in Example 1, except that 7.8 g of APG-100, 9.8 g of APG-200, 17.2 g of APG-400, and 26.6 g of APG-700 all of which were each polypropylene glycol diacrylate available from Shin-Nakamura Chemical Co., Ltd. and having an average number of repeated units of propylene glycol chains of 2, 3, 7 or 12 and a molecular weight of the repeated part of 100, 200, 400, or 700 in place of 26.6 g of PPG #700 DA.

In each of Examples 3 to 6, the volume average particle diameter of the acrylate type polymer to be the core was 0.20 μm and the polymerization conversion ratio of the monomer components forming the acrylate type polymer was 99.5%. As described above, latexes of the core-shell polymer compositions A-A3 to A-A6 each consisting of 75 wt % of a core component and 25 wt % of a shell component were obtained. The polymerization conversion ratio of the total monomer components was 99.6% in all of the cases after completion of the polymerization.

(Production of White Resin Powders B-A3 to B-A6 of Core-Shell Polymer Compositions A-A3 to A-A6)

White resin powders B-A3 to B-A6 of the core-shell polymer compositions A-A3 to A-A6 were obtained in the same manner as in Example 1, except that the latexes of the core-shell polymer composition A-A3 to A-A6 were used.

TABLE 1

| | structure of core shell polymer composition | | | | | evaluation result | | |
|---|---|---|---|---|---|---|---|---|
| Number | core/shell ratio | core composition | shell composition | molecular weight of the component soluble in MEK and insoluble in MeOH | particle diameter of the core polymer | gloss [%] | Izod impact strength [kJ/m$^2$] | Gardner impact strength [inchlbs/mil] |
| Example 1 | 75/25 | BA (73.2) St (0.5) PPG#700DA (1.3) | MMA (23.8) BA (1.2) | 1550000 | 0.20 | 55.2 | 18.5 | 2.42 |
| Example 2 | 75/25 | BA (73.1) St (0.5) PPG#700DMA (1.4) | MMA (23.8) BA (1.2) | 1500000 | 0.20 | 55.0 | 18.1 | 2.39 |
| Comparative Example 1 | 75/25 | BA (74.3) St (0.5) AMA (0.2) | MMA (23.8) BA (1.2) | 900000 | 0.20 | 41.0 | 15.5 | 1.92 |

Comparison of Examples 1 and 2 with Comparative Example 1 makes it clear that high impact resistance and good surface gloss of molded articles are obtained in cases that the core-shell polymer composition (b) was obtained by polymerization of shell-constituting component in the presence of cores obtained by polymerization of 70% to 99.95 wt % of alkyl acrylates having an alkyl group of 2 to 18 carbon atoms, 0.05% to 10 wt % of polyfunctional monomers, and 0% to 20 wt % of monomers copolymerizable with them (total 100% by weight), in which the polyfunctional monomer was one or more compounds selected from polypropylene glycol diacrylate and polypropylene glycol dimethacrylate, and that the molecular weights of the components of the core-shell polymer composition (b) soluble in methyl ethyl ketone and insoluble in methanol were 500,000 or higher.

Examples 3 to 6

Production of Core-Shell Polymer Compositions A-A3 to A-A6

Core-shell polymer compositions A-A3, A-A4, A-A5, and A-A6 were produced as Examples 3, 4, 5, and 6, respectively, (Preparation of Thermoplastic Resin Compositions C-A3 to C-A6)

Thermoplastic resin compositions C-A3 to C-A6 were obtained in the same manner as in Example 1, except that white resin powders B-A3 to B-A6 were used in place of the white resin powder B-1.

(Preparation and Evaluation of Molded Article)

Window frame molded articles were prepared by the same method as in Example 1 except for using the obtained thermoplastic resin compositions C-A3 to C-A6 in place of the thermoplastic polyester resin composition C-1, and the surface gloss, Gardner impact strength, and Izod impact strength were evaluated by the same method as in Example 1.

(Measurement of Free Polymer Molecular Weight)

Using the core-shell polymer compositions B-A3 to B-A6, the weight average molecular weights of the components soluble in methyl ethyl ketone and insoluble in methanol were measured by the same method as in Example 1.

Table 2 shows the types of the polyfunctional monomers, that is, crosslinking agents used in Examples 3 to 6, and the evaluation results of the respective molded articles obtained accordingly, that is, the measurement results of the surface gloss, Gardner impact strength, and hod impact strength.

TABLE 2

| Number | type of the polyfunctional monomer | molecular weight of free polymer | evaluation result | | | |
|---|---|---|---|---|---|---|
| | | | gloss [%] | 0° C. Izod impact strength [kJ/m$^2$] | 23° C. Izod impact strength [kJ/m$^2$] | Gardner impact strength [inchlbs/mil] |
| Example 3 | APG-100 | 2300000 | 54.8 | 11.0 | 20.4 | 2.36 |
| Example 4 | APG-200 | 2400000 | 57.5 | 10.7 | 19.4 | 2.36 |
| Example 5 | APG-400 | 1900000 | 57.4 | 11.3 | 20.3 | 2.43 |
| Example 6 | APG-700 | 1400000 | 54.6 | 11.0 | 20.3 | 2.35 |

The invention claimed is:

1. A thermoplastic resin composition comprising 100 parts by weight of a thermoplastic resin (a) and 0.5 to 30 parts by weight of a core-shell polymer composition (b),
wherein the core-shell polymer composition (b) is obtained by polymerizing a shell-constituting component in the presence of a core obtained by polymerizing a core-constituting component,
the core-constituting component contains 70% to 99.95% by weight of an alkyl acrylate having an alkyl group of 2 to 18 carbon atoms, 0.05% to 10% by weight of a polyfunctional monomer having an average of 3 to 8 propylene glycol chain repeating units, and more than 0% to 20% by weight of a monomer copolymerizable with the alkyl acrylate and/or the polyfunctional monomer, the total amount of which is 100% by weight,
the polyfunctional monomer is one or more selected from the group consisting of polypropylene glycol diacrylate and polypropylene glycol dimethacrylate, and
the weight-average molecular weight of a component soluble in methyl ethyl ketone and insoluble in methanol of the core-shell polymer composition (b) is 500,000 or higher.

2. The thermoplastic resin composition according to claim 1, wherein the core-shell polymer composition (b) contains 50% to 95% by weight of the core-constituting component and 5% to 50% by weight of the shell-constituting component, based on the total amount of the core-shell polymer composition (b) being 100% by weight.

3. The thermoplastic resin composition according to claim 2, wherein the thermoplastic resin (a) is a vinyl chloride based resin.

4. A molded article obtained by molding the thermoplastic resin composition according to claim 3.

5. The molded article according to claim 4, wherein the molded article is a window frame or a door frame.

* * * * *